H. F. NOTBOHM.
Middlings-Purifier.

No. 167,619. Patented Sept. 14, 1875.

Witnesses:

Inventor:
Harman F. Notbohm

UNITED STATES PATENT OFFICE.

HARMAN F. NOTBOHM, OF MILWAUKEE, WISCONSIN, ASSIGNOR OF ONE-HALF HIS RIGHT TO EDWARD C. NOTBOHM, OF SAME PLACE.

IMPROVEMENT IN MIDDLINGS-PURIFIERS.

Specification forming part of Letters Patent No. 167,619, dated September 14, 1875; application filed April 9, 1875.

*To all whom it may concern:*

Be it known that I, HARMAN F. NOTBOHM, of Milwaukee, county of Milwaukee and State of Wisconsin, have invented an Improvement in Middlings-Purifiers, of which the following is a specification:

My invention overcomes and remedies a heretofore very serious trouble and difficulty experienced with reciprocating or vibrating shakers, conveying frames, or screens, which are so generally used in middlings-purifiers. These shakers, as heretofore constructed and arranged, in order to cause the material to be operated upon to travel over and along the same, it was necessary to give so great a vibratory motion, that after a few months' use the hangers, braces, or supports thereof would become loose, allowing the shaker to drop or fly in different directions when in motion, thereby tearing the bolt-cloth and becoming troublesome to those operating the machine, while at the same time the work done thereby would be uneven and of less value.

This invention, therefore, consists in devices hereinafter described and pointed out in the claim, whereby the hangers, braces, or supports of the shaker-screen or conveying-frame in middlings-purifiers, or in any similar machines, are constantly kept in a relative working position while the machine is in operation.

Figure 1:
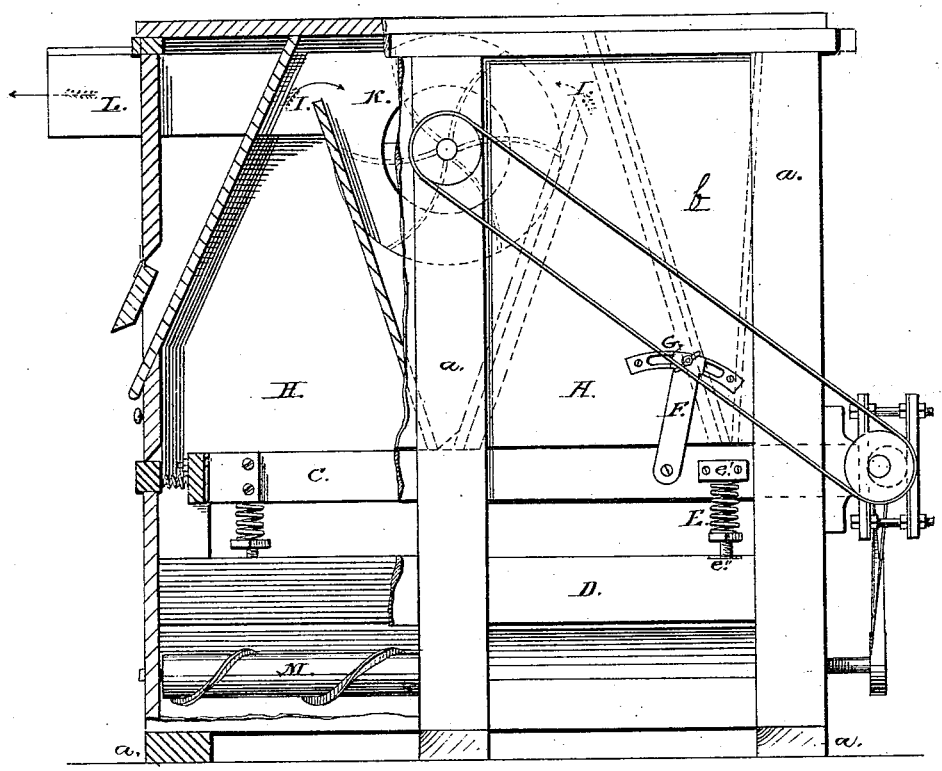
Figure 2:
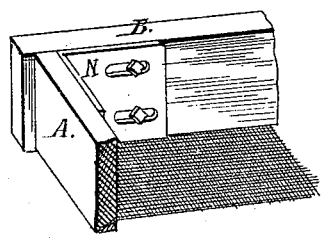

Figure 1 represents a longitudinal side view of the machine and this improvement.

A is the main frame or casing of the machine. b is the feed-hopper, from which the middlings are fed to the shaker C. D D are longitudinal girts in the main framing. E E are adjustable coil-springs, resting in sockets E'' on the girts D D, and supporting the shaker C by having the corresponding socket E' fastened to said shaker in such a manner as to continually hold it in a relative position while in motion.

When the springs are in their position they may easily be adjusted by means of the bolts which extend into them, and which have a nut under the socket in which the springs rest, by which, when turned, the springs may be made to convey greater or less pressure, as may be desired. In some cases it may be desirable to place the springs upon the girts arranged transversely across the machine. By so supporting the shaking frame and holding it firmly against the braces or hangers F there is no lost motion, and all jarring or loose wrapping thereof is avoided, besides decreasing the amount of vibration formerly necessary to cause the middlings or other material to travel along shakers, screens, or conveying-frames.

Instead of coil-springs, herein described, other kinds of springs may be used to accomplish the same result, but I deem these preferable.

This method of supporting the shaker by means of hangers or braces and springs is also applicable to conveying-frames, over which the material passes to be operated upon by the air-currents.

F F are braces or hangers, which, at their lower end are fastened to the shaker, while the upper part thereof can be changed in the arc-circles G on the sides of the machine from a perpendicular to any desired angle, and can be permanently fastened in said arc-circles G, when desired, by set-screws for that purpose.

As the mode of operation of middlings-purifiers is so fully and readily understood I deem it unnecessary to herein give a minute and detailed manner of such operation.

Having described my particular improvement, I claim as my invention—

The combination, with a longitudinally reciprocating or vibrating shaker, screen, or conveying-frame, suspended on pivoted hangers or braces, of springs for supporting the same, whereby the hangers or braces are kept in their relative working position, substantially in the manner shown and described.

HARMAN F. NOTBOHM. [L. S.]

Witnesses:
C. H. RIDDLE,
RICHD. C. NOTBOHM.